INVENTOR
JOHN DAVID CIST

BY Harry J. McCauley
ATTORNEY

*INVENTOR*
JOHN DAVID CIST

*ATTORNEY*

INVENTOR
JOHN DAVID CIST

BY Harry J. McCauley

ATTORNEY

United States Patent Office 3,427,462
Patented Feb. 11, 1969

3,427,462
DEFECT DETECTOR WHICH SIMULTANEOUSLY VIEWS A LARGE AND SMALL AREA OF THE SAMPLE
John David Cist, Wilmington, Del., assignor to E. I. du Pont de Nemours and Company, Wilmington, Del., a corporation of Delaware
Filed Aug. 5, 1966, Ser. No. 570,517
U.S. Cl. 250—219      15 Claims
Int. Cl. G01n 21/32, 21/30

ABSTRACT OF THE DISCLOSURE

A method and apparatus for product characterization employing paired aperture area sensing to achieve variability size discrimination.

---

This invention relates to a method and apparatus for variability size discrimination by area sensing and is useful for the characterization of webs, particularly webs incorporating polymeric fibers as a substantial ingredient, the characterization of running yarns or strands by profile examination and the like.

In the prior art numerous ways have been described for measuring and interpreting the degree of variability in webs, such, as for example, paper web formation. In general, these instruments utilize photoelectric scanning and one known device incorporates an electronic circuit having built-in frequency band passes which are capable, to a degree, of anomaly size range perception. However, such instruments require that the web run at a substantially constant velocity to give meaningful results and are additionally sensitive to periodic disturbances in web constitution.

Recently, in the Zabel et al. patent U.S. 3,114,791, an apparatus has been described which permits measurements of paper formation which are reported to be substantially independent of sheet velocity. Zabel et al. utilize a pair of spaced equi-sized apertures rigidly fixed in precise very close proximity and separated one from another by an opaque partition. The sheet is then illuminated by a light source and the intensity of the two light beams passing the apertures is independently sensed photoelectrically, the difference between the two intensities constituting a measure of sheet variability.

The Zabel et al. device has the disadvantage that measurement selectivity is dependent not only on aperture size but on aperture spacing as well, making the apparatus concurrently sensitive to anomaly periodicity in the sheet, so that certain anomaly spacings have an inordinate effect on instrument operation whereas others can be more or less suppressed. In addition, reliance on aperture spacing for anomaly size selection is objectionable in that such a design responds also to average spacing between anomalies, so that change in the latter gives spurious readings indicative of a change in product quality which is not necessarily in proportion to a change in the number of anomalies per unit length of sheet. Also, the Zabel et al. apparatus is not easily adapted to the simultaneous appraisal of anomalies in two, three or more different size ranges, and is not readily changeable from one range to another.

The purpose of my invention is to provide a method and apparatus for characterizing webs and running strands or yarns of random structure, and to accomplish this completely independently of the traveling web velocity, and substantially independently also of any periodicity in the spacing of anomalies sensed. Another object is to provide a characterization which is correlative with visual judging and, in addition, is an improvement thereover. Another object is to provide a way of simultaneously appraising web and strand or yarn variability in several preselected anomaly size ranges. A further goal is to provide an apparatus which is readily adjustable for use with any specific anomaly size range, and which permits rapid shifting from one such size range to another should this be required.

The manner in which these objects are achieved will become clear from the following detailed description, and the drawings, in which:

FIGS. 11A–11F, inclusive, are semi-log plots of fractional response versus anomaly diameter (or, instead, ripple wavelength for FIG. 11F) of various combinations of aperture and anomaly shapes showing generally the effect of shape, as follows:

FIG. 11B—a pair of round apertures, one ¼" dia. and the other 1" dia. viewing round anomalies disposed along the line of aperture centers, FIG. 11C—a pair of square apertures, one ¼" on the side and the other 1" on the side viewing round anomalies.

FIG. 11D—a pair of round apertures, one ¼" dia. and the other 1" dia., viewing bar anomalies disposed transverse the apertures, FIG. 11E—a pair of square apertures, one ¼" on the side and the other 1" on the side, viewing bar anomalies disposed transverse the apertures, and FIG. 11F—a pair of round apertures, one ¼" dia. and the other 1" dia., responsive to sinusoidal spatial radiation excitation, FIG. 14C is a circuit diagram of the signal read-out of the apparatus of FIGS. 14A and 14,B FIGS. 15 A and 15B are diagrammatic representations of another embodiment of this invention employing pairs of noncoincident different-sized sensing apertures.

Generally, this invention comprises a method of variability size discrimination by area sensing comprising directing a beam of radiation at an object to be examined, simultaneously viewing radiation emanating from a first area $x$ of the object and a second area of the object which is a fraction of $x$, the first area and second area being proportioned so as to define between them a preselected range of object anomaly size, balancing the 100% signal responses of the first area and the second area to substantial equality prior to conducting the size discrimination, and obtaining an index of the quality of the object as a function of the amounts of radiation emanating from the first area of the object and the second area of the object, together with apparatus for carrying out the method.

As will become clear from the detailed description which follows, this invention is broadly applicable to the examination of any objects as to which the existence of variations therein perceptible to radiation scanning afford an index of the qualities of the objects. Two important such characterizations treated by way of example solely, involve (1) the examination of planar web surfaces and (2) profile examination of a running strand of yarn displaying peripheral irregularities.

At the outset, it might be said that the webs which are to be examined according to this invention possess two pervading characteristics which constitute important criteria for ultimate web usefulness the first of which, for lack of a better name, is usually referred to in the art as "blotchiness," which is a macro pattern of light and dark areas quite easily recognized and related comparatively between different web products, thus easiest to cope with, whereas the other is the so-called "graininess," "dispersion" or "ropiness" this being the contribution of small-sized anomalies (but still clearly visible to the eye). Hitherto, products have been graded visually for both blotchiness and graininess, with inevitable disagreement as to relative status as a result of the subjective nature of the examination performed, and it is an object of this invention to effect characterization more objectively than has hitherto been practicable.

It should be stressed that web "anomalies" as concerns this invention are, in general, any local regions in th web which affect the test radiation uniquely with reference to an accepted norm, that is, which increase or decrease test radiation emanated therefrom, and are not limited to structural defects, although these are often concomitantly discernible, but rather might be categorized chiefly as those features which affect appearance primarily.

Also, while the localized existence of anomalies is, of course, important to web inspection, which, as hereinafter described is one function which equipment according to this invention can be made to perform after modifications, the primary purpose is, instead, overall web characterization, which is most concerned with the trend of visually perceptible web appearance features rather than spot conditions reflective solely of local non-uniformities.

Grainless appraisal is, then, a primary concern of this invention, and this is accomplished by the utilization of one or more pairs of web-viewing areas of preselected magnitude functioning in concert which, as to each pair, define a difference passband yielding a quantitative response to a preselected size range of web anomalies. The web-viewing areas employed in this invention can be conveniently defined by apertures, or by proportioning the extents of areas encompassed by associated optical sights.

Figure 1:
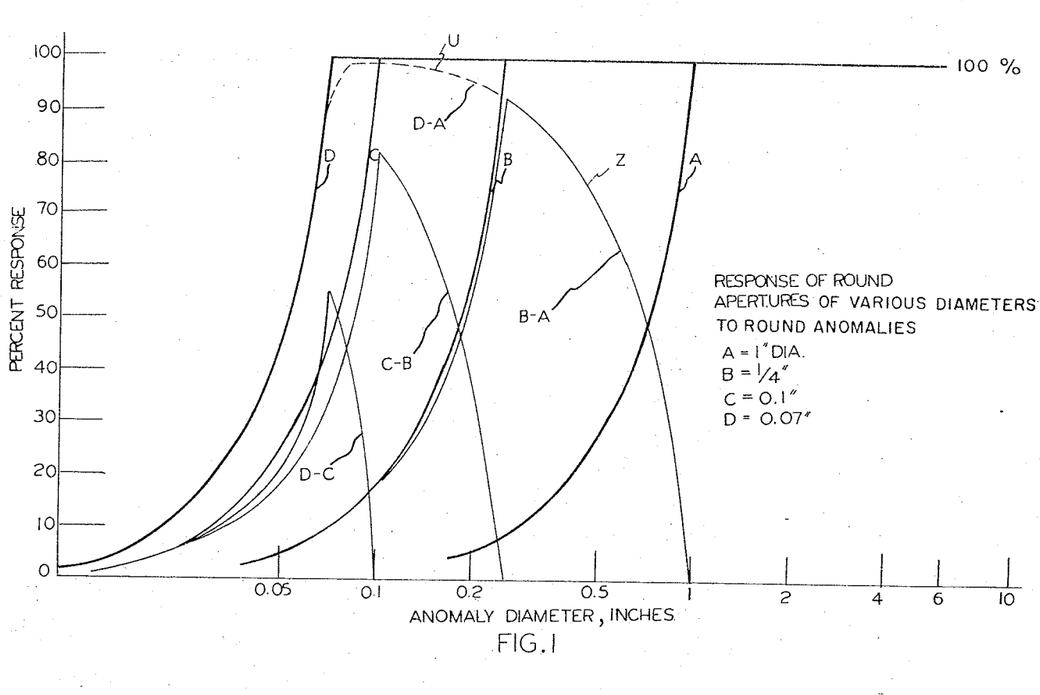
FIG. 1 is a theoretical semi-log plot of instrument response to round anomalies of various sizes by four different sizes of paired apertures defining web examination areas viewed, with and without perception based on subtraction of sensing photodetector outputs.

Referring to FIG. 1, if a web is simultaneously viewed by independent photodetectors looking through two apertures B and A (in this instance ¼" and 1" dia. round, respectively), both apertures will, of course, respond 100% to anomalies which are 1" in size or larger which impinge squarely across their lines of sight and will also respond, but in a progressively attenuated fashion, to smaller anomalies as indicated by curves B and A individually. Similarly, the ¼" dia. aperture will, by itself, respond 100% to anomalies ¼" or larger impinging squarely across its line of sight and, additionally, will respond to even smaller-sized ones to an extent indicated by curve B. In practice, each of the apertures displays negligible response to anomalies less than about 10% of its specific aperture diameter.

Now, if the 100% signal response of the aperture defining the large area of web examination is initially balanced to substantial equality with that of the aperture defining the small area of web examination and if the characteristic response of the larger-sized aperture (Curve A) is then subtracted from that of the smaller (Curve B), there is obtained a sharply defined Curve Z which, within it, defines a difference passband B minus A, which constitutes a quantitative electrical response as a function of anomaly size utilizable for characterization according to this invention.

While the plot of FIG. 1 is unique to round apertures in service in the appraisal of round defects, the influence of particular shapes of either apertures or defects are of relatively small significance, as will be seen by inspection of FIGS. 11A through 11F, which relate to different combinations of square and round apertures with different shapes of anomalies. It is apparent that the shapes of the several passbands are somewhat different but, otherwise, consistency is preserved throughout.

Figure 2:
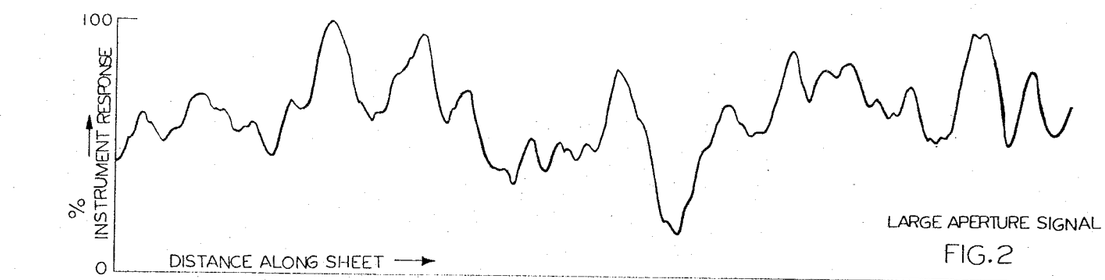
FIG. 2 is a recorder plot of the continuous output of a photodetector viewing a web through a large rectangular aperture (¾" x ¼") which, in this instance, encompassed an effective web area of 1.5" x 0.5", the ordinate being percent instrument response and the abscissa being distance along a traveling fibrous non-woven sheet.
Figure 3:
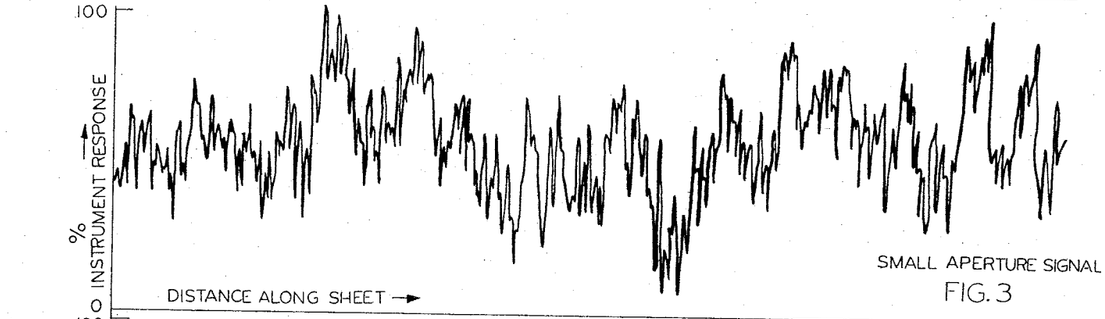
FIG. 3 is a plot similar to that of FIG. 2 recorded simultaneously therewith consisting of the photodetector output when viewing the same web throughout the identical length of FIG. 2 but through a smaller rectangular aperture (⅛" x ⅛" encompassing an effective web area of ¹⁄₁₆" x ¹⁄₁₆".
Figure 4:
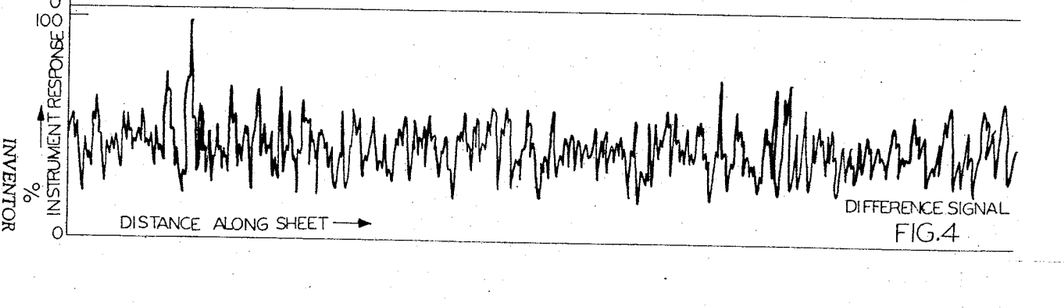
FIG. 4 is a plot of differential signal output from the photodetectors used in FIGS. 2 and 3, but somewhat later in time.

Referring now to FIGS. 2 and 3 the instantaneous photodetector response for the large aperture A (FIG. 1) hereinbefore described is, typically, the rather regular trace shown in FIG. 2, which constitutes a measure of blotchiness as hereinbefore defined. Similarly, the instantaneous photodetector response for the small aperture B (FIG. 1) of the pair is the trace of FIG. 3 showing high frequency fluctuations throughout, which constitutes a measure of the identical blotchiness characteristic of FIG. 2 but, in addition, incorporates energy attributable to the graininess as well. Now, if the signal of FIG. 2 is subtracted from that of FIG. 3 there is obtained a difference signal such as that shown in FIG. 4 which is a unique measure of graininess per se. (It should be mentioned that the specific difference signal plot of FIG. 4 is not, in fact, the difference signal resulting from trace subtraction of FIGS. 2 and 3, having been taken approximately 10 secs. later due to peculiarities in the equipment employed in performing the test. Nevertheless, the general appearance of FIG. 4 is quite indistinguishable from the actual subtractive signal, had that been taken.)

The instantaneous signals reproduced in FIGS. 2–4, inclusive, are not in themselves convenient for manufacturing control, because, unless measured intermittently, which is, however, entirely practicable, the masses of data which they incorporate are incapable of useful assimilation in the form in which acquired, and so the traces have been included primarily as an aid in teaching the principles underlying this invention. In practice, a subsequent computation adapted to detect trends is preferred, all as hereinafter described in detail.

FIG. 1 clearly indicates the importance of properly sizing associated web-viewing area pairs. If the area-defining aperture sizes are made to approach each other, the selectivity of the system, as indicated by the progressive sharpening of response peaks, e.g., D minus C compared with C minus B and this, in turn, compared with B minus A, is increased, but with an accompanying decrease in sensitivity. Sensitivity is a function of the height of the several difference passbands, the ultimate selectivity being attained when the apertures approach the same size but the sensitivity approaches zero. If the aperture sizes are made widely different, the passband becomes broad (e.g., D minus A, which encompasses not only all area under Curve Z but also that under the extension denoted by broken line Curve U as well and, in the ultimate, the large aperture channel then serves only to compensate for essentially D-C changes in the system, such as those caused by changes in lamp intensity. However, for multi-difference passband characterization as hereinafter described, multiple area pair viewing within passbands such as D minus C, C minus B, and B minus A is highly useful.

In practice, where aperatures are used to define the web-viewing areas, aperture shapes are selected in accordance with the kind of averaging desired in the large area. Preferably, the large aperture will then be long in the machine direction, in order to provide area averaging without, at the same time, affording opportunity for defects to pass across the large aperture and yet miss the small aperture. For many webs a rectangular large aperture of approximately 1.5" length is entirely suitable, with the width being approximately equal to the lateral dimension of the small aperture.

If easy adjustability in viewing area definition is desirable, it is simplest to use irises as aperatures. These provide basically round viewing ports, but, of course, the sight can be changed to any desired shape by employing, in conjunction therewith, masks of suitable size and shape to define the effective dimensions. In any case, unmasked small aperatures of round shape can be employed satisfactorily with larger unmasked apertures of either round or non-round shape.

This invention is adapted to operate on either transmitted radiation or reflected radiation emanating from the web under examination but, since the usual situation involves transmitted radiation, it will be described in this connection throughout.

Figure 5:
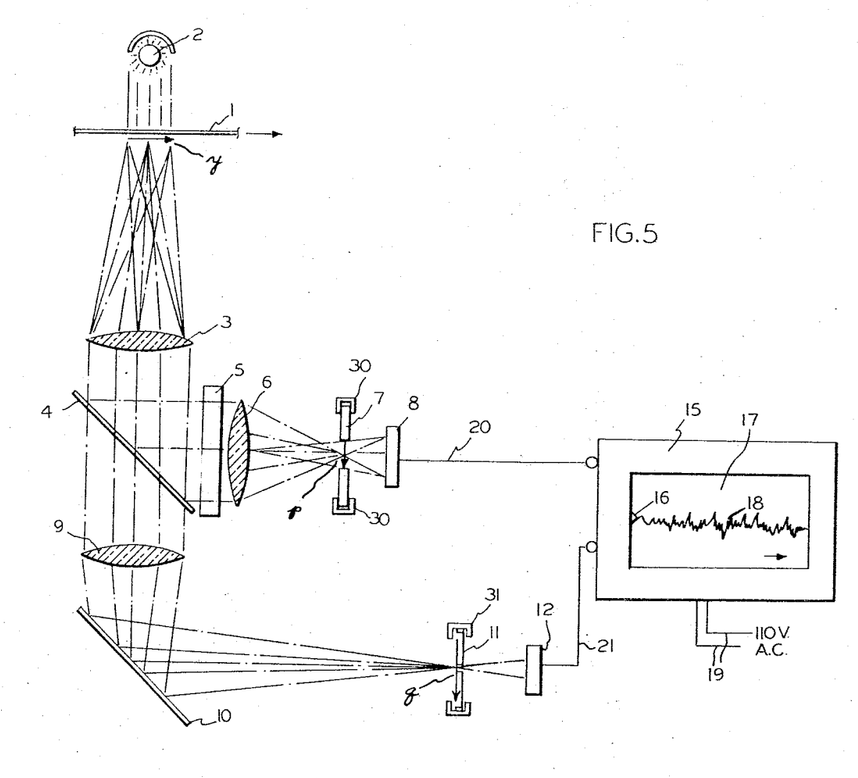
FIG. 5 is a schematic view of a preferred embodiment of apparatus according to this invention utilizing transmitted light and a non-contacting associated optical system.

Referring now to FIG. 5, a preferred embodiment of the invention wherein web-viewing area definition is achieved by apertures utilizes a radiation source 2, which, for visible radiation can typically be a 35 watt, 6 v. resistance lamp of the photographic transparency projection type (e.g., a Sylvania DKN lamp) which illuminates the running web 1 in examination, transmitting the test radiation from an area of the web denoted y via a collimating lens 3 to a reflecting-transmitting mirror 4 (typically, a Duolux 70% transmitting —30% reflecting semi-transparent mirror). Reflected radiation from this mirror is directed into one path which, in this instance, although the placement can optionally be reversed, contains the large aperture 7, preceded by a focusing lens 6 and an iris 5 provided to balance the light intensity in the two paths, whereas transmitted radiation from mirror 4 passes thence to a focusing lens 9 and a totally reflecting mirror 10, which directs it to the other aperture of the pair, which, in this instance, is small aperture 11.

It should be stressed that iris 5 is provided in the large aperture channel solely as a radiation intensity regulator, which in no way affects the field of view preselected exclusively by large aperture 7. Focusing lens 6, is provided to form an image which, in a typical instance can be approximately y/2, indicated by arrow p in the plane of large aperture 7. Similarly, in a typical case, lens 9 was of 172 mm. focal length, bringing a web image q of size approximately 2y to focus at the aperture plane 11. The optical magnification by a factor of approximately 2 in the small aperture channel and concurrent minification by a factor of approximately 2 in the large aperture channel are solely matters of optical design detail resorted to to achieve more nearly equal area illumination of the photodetectors used in spite of the different aperture sizes, with attendant better matching of characteristics of photodetector 8, responsive to radiation passed by the large aperture 7, and photodetector 12, responsive to radiation passed by the small aperture 11, which photodetectors can typically be RCA SL2205 designs. It will be understood that the optical arrangement detailed, of course, still preserves a difference passband association of two different-sized web-viewing areas, such as D minus C, C minus B or B minus A as previously described with reference to FIG. 1, optical details notwithstanding.

The electrically transduced radiation signals from the large and small apertures 7 and 11 are transmitted via leads 20 and 21, respectively, to conventional amplifying, signal-subtracting and difference signal display means denoted generally at 15, independently powered from 110 v. A-C mains 19, and provided with a tracing pen 16 recording a difference signal 18, such as that hereinbefore described with respect to FIG. 4, on a constant-speed rightward-moving chart 17.

In usual practice, trace indication 18 can be interpreted by the observer in terms of its deviation from a reference norm, which can constitute any given horizontal chart line arbitrarily chosen as the standard to which manufacture is to conform. The full amplitude of the trace measured vertically is a measure of variability in the web under examination and, in fact, a sheet displaying no measurable variability would possess a substantially straight horizontal line trace, whereas a sheet with wide variability would have a wide band of oscillation as signal trace.

The record produced by instrument 15 has proved to be correlative with visual appraisals of web characterization and can be safely relied upon as a guide upon which to base machine adjustments, raw material input specifications and the like; however, a computed index has even better correlation besides, in itself, usually incorporating an averaging action which reveals trend drifts to best advantage, and this approach is therefore preferred.

One computed index preferred is the variance, $\sigma^2$, which is the standard deviation squared, defined as follows:

$$\sigma^2 = \frac{1}{\gamma} \int_0^\gamma (s - \bar{s})^2 dt$$

where $s$=amplitude of instantaneous signal,
$\bar{s}$=mean amplitude of signal,
$\gamma$=memory time of computer as set by operator,
$dt$=an increment in time.

The variance is a measure of the energy content of the variations in input signal, i.e., the waveforms of FIGS. 2–4, inclusive, and therefore possesses the important advantage of preserving its accuracy in spite of changes in signal waveform.

The advantages of reliance on a computed index include elimination of the need for high speed recording, e.g., in the manufacture of non-woven sheets at high product delivery rates of several hundred feet/min. In addition, small changes in variance are more perceptible when averaged, and the measurements are more precise. Furthermore, while the subtraction process giving the difference trace of FIG. 4 is quite effective in removing the very extensive hills and valleys of the traces of FIGS.

2 and 3, further smoothing of the difference signal is desirable and is readily accomplished as an incident of variance computation.

Figure 6:
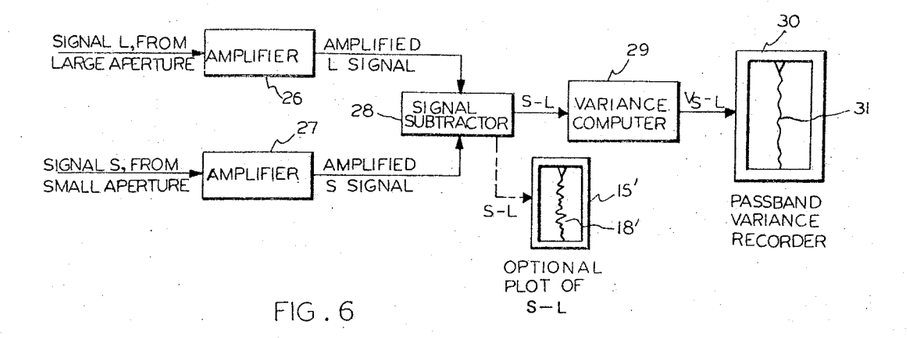
FIG. 6 is a block diagram showing one arrangement of amplifying, computing and interpreting means for apparatus according to this invention wherein the output of one photodetector is subtracted from the other and a single variance determination is made.
Figure 7:
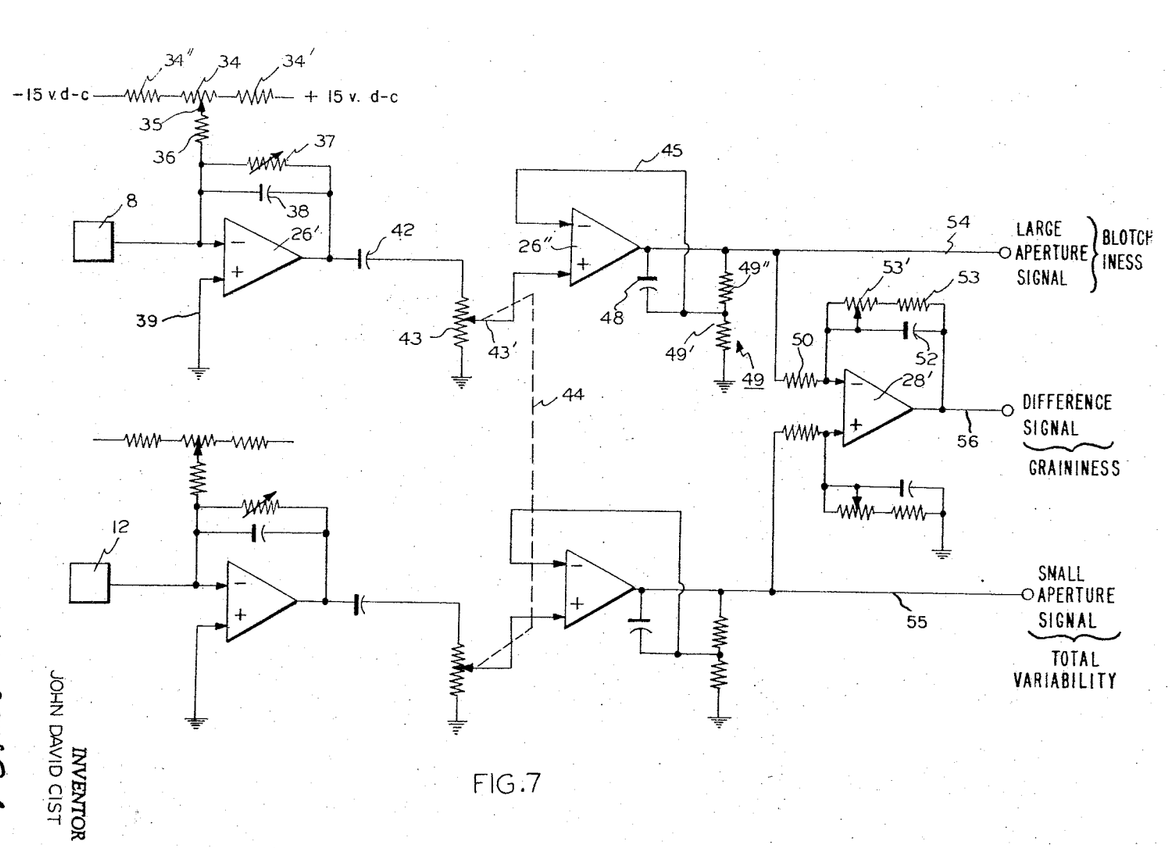
FIG. 7 is a detailed electrical circuit diagram for the apparatus of FIG. 6, except that the variance computation apparatus is omitted.

A preferred method of variance computation is that depicted in block diagram in FIG. 6, which can conveniently utilize an electrical circuit such as that detailed in FIG. 7.

Referring to FIG. 6, the signal, denoted L, from the large aperture 7 of the FIG. 5 apparatus is passed to its individual amplifier 26, preferably a multi-stage type as detailed in FIG. 7, and the signal S from small aperture 11 is similarly processed in its amplifier 27, after which the signals are subtracted in difference amplifier 28 to give an S–L differential signal which can, optionally, be read out as a difference signal of the same type as that depicted in FIG. 4 by voltage output to recorder 15' yielding the trace 18'. Concurrently, however, the S–L signal (taken as the quantity $s$) is passed to variance computer 29, which is of conventional design and consequently not further described here, the resulting variance output signal $V_{S-L}$ passing to recorder 30 where it is traced out as a line signal 31 notably smoother than 18'. Trace 31 possesses an improved correlative relationship with visual web appraisals and has thus proved to be an extremely effective aid in product characterization and in web making.

One convenient electronic circuit for the apparatus of FIG. 6 constitutes the two identical channels shown in FIG. 7, each connected with an individual one of the photodetectors 8 and 12. Each channel has its own voltage source which, explained for the upper (large aperture) channel only, can incorporate a zero adjust sub-circuit consisting of variable tapped resistor 34 and end-loading resistors 34' and 34", each typically 10K ohms, connecting in turn to a +15 v. D-C supply and a —15 v. D-C supply, respectively. Tap 35 of resistor 34 is connected to the negative terminal input side of pre-amplifier 26' (typically a Philbrick model P65A) which is, effectively, a D-C amplifier, through resistor 36 (1 megohm). Amplifier feedback connections are provided via shunt-connected variable resistor 37 (1 megohm) and capacitor 38 (50 $\mu\mu$f.). The essential preliminary balancing of the two channels as regards 100% signal responses of the first viewed area and the second viewed area to substantial equality before object characterization is commenced is facilitated by the two adjustable resistors 37. The positive input terminal of amplifier 26' is connected to a common reference potential level, such as ground, via connector 39.

Preamplifier 26' is coupled to the input side of A-C amplifier 26" (typically a Philbrick P65AU) via blocking capacitor 42 (typically 200 $\mu$f.) and voltage divider 43 (30K ohm), the tap 43' of which is ganged through manual adjustor 44 with the corresponding tap in the small aperture channel. Pre-setting of ganged adjustor 44 permits compensation for different basis weights of webs in examination, because a given departure in basis weight for the same web stock obviously represents a larger percent change in signal strength for a thin web than for a thick web. These taps are connected to the positive input sides of amplifiers 26", which are each provided with negative feedbacks through shunt connections 45, which each include in circuit therewith capacitors 48 (typically 100 $\mu\mu$f.) for the purpose of inhibiting oscillations. Dual resistor 49 made up of section 49' (1K ohm) connected to ground and section 49" (typically 10K ohms) constitutes a voltage divider defining the gain of amplifier 26". Finally, the amplifier 26" output is coupled via resistor 50 (typically 5K ohms) to difference amplifier 28' (which can also be a Philbrick model P65AU). Feedback for the upper channel of difference amplifier 28' is provided by shunt resistor 53 (typically 5K ohms) in series with variable resistor 53' (typically 10K ohms), shunted in turn by capacitor 52 (typically 100 $\mu\mu$f.) to ensure stability. Essentially the identical subcircuit is incorporated in the lower channel, except with connection to ground, to permit adjusting the lower channel signal to balance with the upper channel.

The objective of balancing the 100% signal responses of the first viewed web area and the second viewed web area to substantial equality prior to conducting operation is to obtain large-scale cancellation of outer limit perception by both apertures in order to more sharply define the difference passband established by the pair. The "100%" adjective refers to perceptions obtained by viewing the entire expanses of the two areas (apertures) involved.

Thus, after a pair of apertures is selected on the basis of special attention to be paid to a given size of anomaly which is known to primarily influence some end use of the product, such as, for example, the printability, the intensity of light source 2 emission is adjusted to insure that the small aperture of the pair will pass enough radiation to permit characterization of the web product having the basis weight as received. This check is conducted on the thickest sample of material which it is necessary to evaluate.

Next, with a radiation-impervious barrier interposed across the emission path from source 2, the measured voltage outputs of the two pre-amplifiers 26' are brought to some preselected common level, typically zero, by adjustment of taps 35 along resistors 34.

Then, a neutral density filter, which can typically be a 60 mesh, stainless steel W. S. Tyler Co. screen of 10 mil. dia. wire (open area 16.2%), together with a uniform diffuser, such as Kodak opal glass to simulate the light diffusing properties possessed by many web products, is placed across both light paths and the reading of pre-amplifier 26' for the small aperture channel only is taken. This screen-diffuser combination is, in effect, a web of simulated basis weight within the range being dealt with and has the advantage of being a durable, readily available reference upon which to base subsequent operations, making it unnecessary to retain a web specimen, which might easily soil or otherwise change in appearance. This numerical value reference can be, to a large degree, chosen as to convenient magnitude by adjusting the source 2 emission intensity and/or adjusting the amplifier gain resistor 37. The adjustment described is, in fact, a standardization operation which permits consistency in day-to-day characterization activities regardless of product basis weight changes or the like.

Finally, with the same neutral density filter in place across both light paths, the pre-amplifier 26' output of the large aperture channel is brought to equality with that of the small aperture channel by adjustment of this channel's gain resistor 37 and/or by suitable adjustment of the iris 5, FIG. 5. This completes the 100% equalization balancing preparatory to operation.

It should be mentioned that this equalization must be preserved intact by subsequent amplifiers 26", which can be achieved by use of precision resistors 49' and 49", and by difference amplifier 28', for which the balancing means provided are adjustable resistors 53'.

As a confirmatory check on the adjustment from the standpoint of obtaining signal linearity, it is preferred to insert yet another screen-type neutral filter of intermediate opacity (typically, 60 mesh size but of a different wire gage diameter, such as 8 mils, having an open area of 27.2%, for example) and again check the outputs of the two pre-amplifiers 26' to determine if they remain equal. If equality does not persist, there exists a non-linear element in the electro-optical circuits which must be identified and eliminated by component substitution until the deficiency is cured.

The 100% signal response equalization test is preferably repeated at regular intervals of, for example, one week or so to safeguard against drifting or other departures from operational consistency; however, this is readily accomplished because of the simplicity of the procedure.

The circuit described makes three separate signals continuously available, namely, (a) the large aperture signal readout L available on lead 54, which is a measure of blotchiness, (b) the small aperture signal readout S available on lead 55, which is a measure of total web variability, and (c) the difference signal readout S–L available on lead 56, which is a measure of graininess and which can thus be supplied to variance computer 29, FIG. 6.

It can sometimes be advantageous to compute the variance counterparts of both blotchiness (L signal) and total variability (S signal), and individual variance computers receiving their inputs from leads 54 and 55, respectively, can conveniently effect these objectives.

Figure 8:
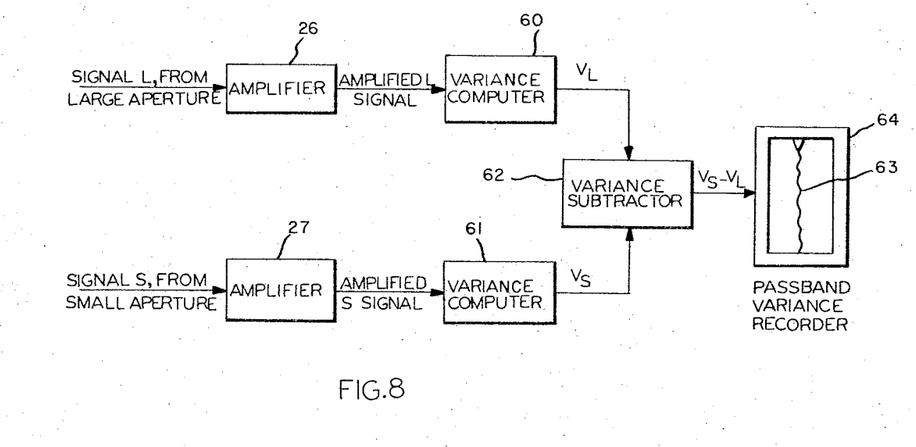
FIG. 8 is a block diagram of a second arrangement of amplifying, computing and interpreting means, wherein variance is separately computed for the output of each photodetector before subtraction, which can be employed with the design of apparatus of FIG. 5, but which is especially applicable to the apparatus design of FIGS. 15A, 15B.

An alternate approach to variance attainment is that depicted in FIG. 8, where the individual variances for the large aperture signal L and the small aperture signal S are separately computed in variance computers 60 and 61, respectively, and the difference obtained with variance subtractor 62. The $V_S - V_L$ output signal is then recorded as a trace 63 by conventional recorder 64.

In this connection the identical circuit of FIG. 7, with difference amplifier 28' however eliminated, can be employed for generation of the L and S signal inputs to the individual variance computers 60 and 61, respectively.

Operating experience has indicated that both of the variances described possess equivalent correlations with visual ranking, even though the two approaches are not mathematically equivalent. In some situations the difference of variances can be preferable, because the mathematical properties of this technique are well known in classical statistics. On the other hand, computation of $V_{S-L}$ is accomplished with less equipment, affording corresponding economy, so that it is often an attractive choice.

Figure 9:
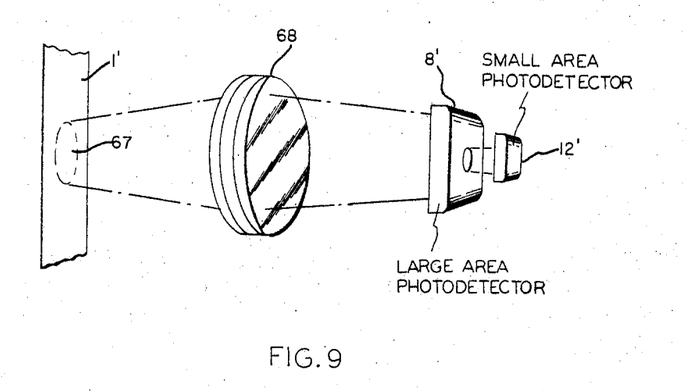
FIG. 9 is a second embodiment of optical arrangement which can be utilized in non-contacting appraisal of a web in examination.

An exceptionally simple and compact, non-contacting transmitted radiation optical system is that shown in FIG. 9, wherein the paired web-viewing areas are defined by the areas of radiation impressed on the photodetectors 8' and 12' themselves, the former (typically an Si photodetector RCA model SL2206) being cut away centrally to expose a preselected area of the latter disposed in optical train behind it. In this arrangement the emanated radiation expanse 67 of web 1' in examination is viewed through convex-convex focusing lens 68 and the collected radiation directed to photodetectors 8' and 12'. The description of electrical circuitry for this embodiment and the two next-following embodiments will be postponed until later, since these circuits all have a great resemblance.

Figure 10:
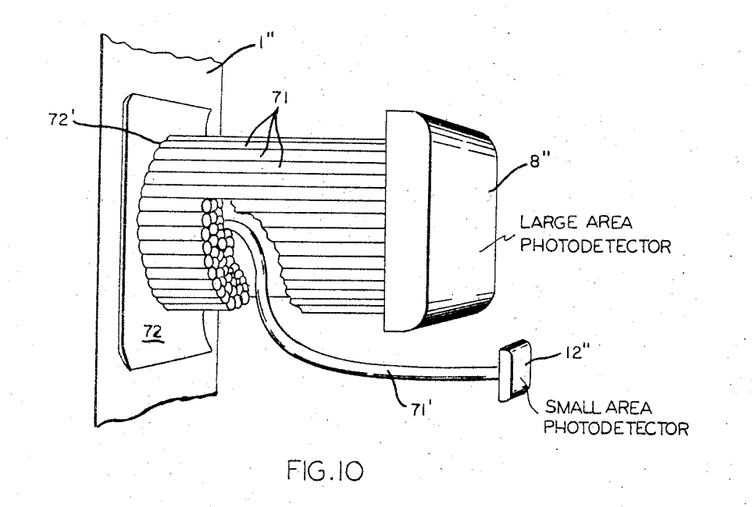
FIG. 10 is a third embodiment of optical arrangement which is adapted to direct contact appraisal of a web being examined.

Turning now to FIG. 10, an optical arrangement for a contacting type apparatus is depicted, this consisting of a bundle of straight, coparallel, closely abutting radiation conductors 71, e.g., fabricated from methyl methacrylate polymer or the equivalent, one of which, 71', is led off to segregate the small web-viewing area radiation supplied to photodetector 12'' whereas the remainder abut the sensitive face of photodetector 8'' and thereby constitute the large area radiation of the pair as hereinbefore described.

The front faces of radiation conductors 71 terminate flush with the plane of the running web 1'' in examination and it is preferred to provide a web back-up plate 72, cut away centrally at 72' to expose the inboard ends of conductors 71 and 71', against which the web is biased by its own tension applied lengthwise thereof, or by rollers disposed on the front side.

Figure 14A:
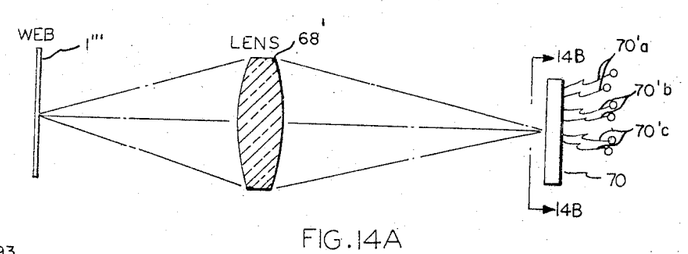
FIG. 14A is a schematic side elevation diagram of an optical arrangement employing concentric photodetector disposition, adapted to the simultaneous appraisal of anomalies in a multiplicity of different size ranges.
Figure 14B:
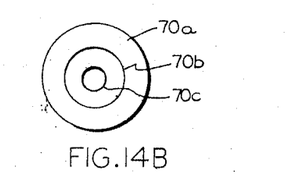
FIG. 14B is a plan view of the multi-sectional photodetector taken on line 14B—14B of FIG. 14A.

A somewhat similar photodetection system is that portrayed in FIGS. 14A and 14B; however, the objective here is multiple area pair simultaneous web viewing. Thus, web 1''' is irradiated from the left as seen in FIG. 14A and the transmitted radiation collected and focused by convex-convex lens 68' after which it is directed to the sensitive face of the tri-element photodetector (typically a Solar Systems, Inc. Model SS30 cut into separate portions as hereinafter described) indicated generally at 70. As shown in the plan view of FIG. 14B, photodetector 70 comprises three concentrically disposed separate photodetection elements 70a, 70b and 70c, respectively, of progressively decreasing area expanse and insulated peripherally one from another. Each photodetector is provided with its own pair of leads, indicated, respectively, as 70'a, 70'b and 70'c of FIG. 14A.

Now, for all of the embodiments of FIGS. 9, 10 and 14A, 14B, the large area processed signal is most accurately obtained by aggregating the photoresponses of detectors 8' and 12', 8'' and 12'' and 70a, 70b, 70c for the several designs hereinbefore described. The small area signals can then constitute the photoresponses of photodetectors 12', 12'' and 70c, respectively.

Figure 14C:
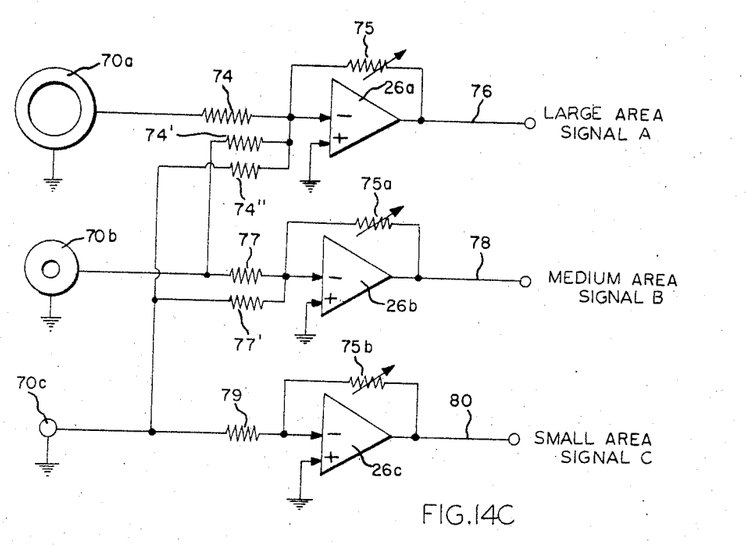

The electronic circuit for the most complicated embodiment, namely, that of FIGS. 14A and 14B, is detailed in FIG. 14C, it being understood that straightforward variations of this are completely satisfactory for the FIGS. 9 and 10 embodiments.

Referring to FIG. 14C, photodetector 70 is shown in separated element, exploded convention to simplify the representation, whereupon the large area signal A is seen to constitute the aggregated sensed response of all three of the photodetectors 70a, 70b and 70c supplied to the negative side of amplifier 26a through summing resistors 74, 74' and 74'', respectively, which can, typically, have resistance values in the 1–10K ohms range. Variable shunt resistor 75 is a usual type feedback resistor of 10–100K ohm value, and the output delivered through lead 76 is a continuous D-C signal adapted to either variance computation or direct utilization, as desired.

Similarly, the medium area signal is the aggregate of the photoresponses 70b and 70c supplied to the megative side of amplifier 26b via individual summing resistors 77 and 77', respectively, with delivery of the output as medium area signal B via lead 78.

Finally, the small area signal is supplied via resistor 79 (typically, 1–10K ohms) to the negative side of amplifier 26c, from whence the small area signal C is derived as output via lead 80. Amplifiers 26a, 26b and 26c can conveniently be Philbrick P65AU types, and the latter two are also provided with individual adjustable feedback resistors 75a and 75b, respectively, typically 10–100K ohms resistance value.

Figure 13:
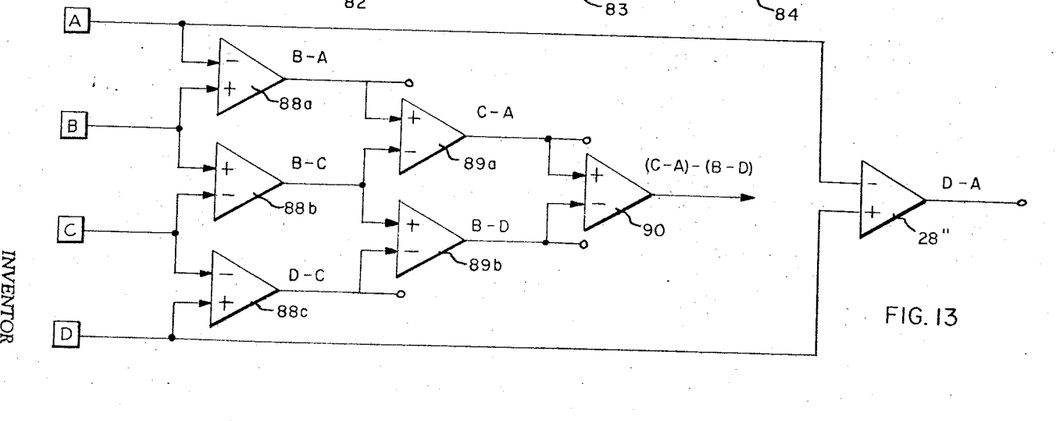
FIG. 13 is a block diagram of a preferred electrical signal obtainment circuit for the apparatus of FIG. 12.

It will be understood that the paired differences B minus A, or C minus B, are separately available from the electronic circuit of FIG. 14C, or, if desired, other combinations are attainable by a circuit such as that shown in FIG. 13.

Figure 12:
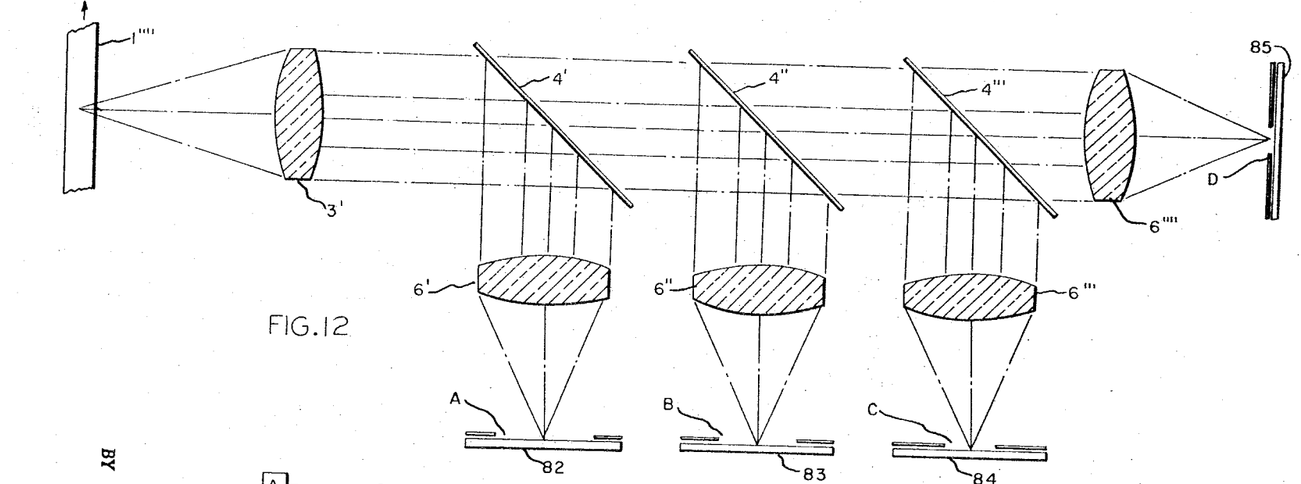
FIG. 12 is a schematic diagram of a typical optical arrangement for the simultaneous appraisal of anomalies in a multiplicity of different size ranges.

A separate channel optical system employing apertures adapted to multiple paired-area simultaneous web examination is shown diagrammatically in FIG. 12, and can comprise collimating lens 3' receiving transmitted radiation emanated from the running web 1'''' and passing it to successive semitransparent optical mirrors 4', 4'' and 4''' in optical train therewith which each divert separate beams to individual focusing lenses 6', 6'' and 6''', respectively. The remaining radiation from lens 3' passes directly to focusing lens 6''''.

In the interests of simplicity in representation, details of radiation intensity regulation irises, such as iris 5 of FIG. 5, are not shown in FIG. 12. However, consistent with previous description (particularly FIGS. 1 and 5), the first channel is reserved to large area-defining aperture A incorporation, with radiation sensing achieved through photodetector 82. Similarly, the next adjacent channel is reserved to somewhat smaller area-defining aperture B, passing radiation to photodetector 83, while successively smaller area-defining apertures C and D, respectively, direct radiations to photodetectors 84 and 85, respectively.

The schematic showing of electrical circuit of FIG. 13 depicts one practicable way of multiple signal handling in order to obtain a relatively wide choice of difference signals. Thus, pairs of progressively decreasing web-viewing area signals, such as A and B, B and C and C and D are individually passed to opposite sides of differential amplifiers 88a, 88b and 88c (typically, Philbrick P65AU), respectively, to give thet separate differences B minus A, B minus C and D minus C, respectively. The latter are then introduced to opposite sides of differential amplifier 89a and 89b (also typically Philbrick P65AU) to obtain C minus A and B—D differences. Finally, the latter are supplied as inputs to opposite sides of differential amplifier 90 (again typically a Philbrick P65AU), giving C minus A plus D minus B. All of the foregoing can be used directly or refined by variance computation, if desired. Should the difference D—A be also required, it is readily obtained by passing these two signals as individual inputs to a signal subtractor amplifier 28", whereupon the output is the D—A difference.

All of the embodiments so far described have employed large and small web-viewing area pairs arranged so that the smallest of each coincidentally views a part of the identical area simultaneously viewed by the associated larger area. This is particularly preferred for close characterization of webs, especially those displaying wide variabilities in structure occurring within relatively small web lengths. However, this invention is operable also where coincident viewing is dispensed with and the schematic showings of FIGS. 15A and 15B detail two practicable dispositions of area pairs for separate viewing.

Figure 15A:
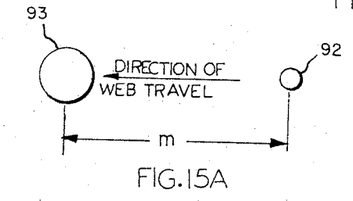

One arrangement is that shown in FIGS. 15A, where the small area is defined by aperture 92 disposed at distance m (typically, 4") along the line of web travel from the associated large aperture 93. Signal generation is effected in exactly the same manner as for the coincident aperture pairs previously described; however, in order to render examinations independent of anomaly periodicity problems, signal utilization as independent variances is resorted to in accordance with the system depicted in FIG. 8.

If desired (FIG. 15B), the non-coincident apertures 92' and 93' may be disposed transversely of the running web, separated by a distance m' (again typically 4"), but this is less preferred because of the possibility of losing detail in one path which is viewed by the associated aperture scanning a completely different path along the web. In addition, the usefulness of this type of apparatus is limited to samples which have equivalent anomaly size distribution in the two adjacent paths.

Figure 15B:
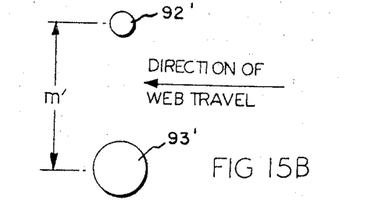

Both of the arrangements of FIGS. 15A and 15B are completely independent as regards aperture inter-spacing so long as independent variance computation of the type taught with reference to FIG. 8 is adhered to to avoid periodicity interference. Indeed, large scale vibration or other disturbance of aperture inter-positioning can be tolerated at no penalty, simplifying the optical design greatly.

The foregoing description has been directed to the examination of planar surfaces, as in web characterization or the like; however, variability size discrimination by area sensing is not limited to this service and can be used for profile examination also, for example.

Figure 16A:
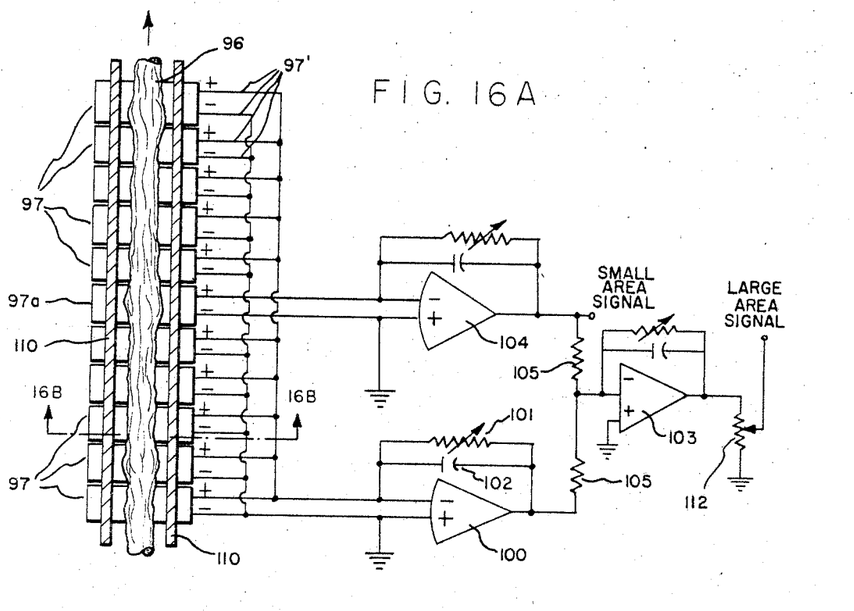
FIGS. 16A and 16B are, respectively, a sectional plan and end elevation views taken on lines 16A—16A and 16B—16B of one another showing a running strand profilometer constructed according to this invention.
Figure 16B:
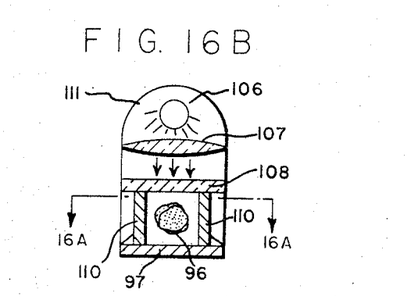

Thus, in FIGS. 16A and 16B there is shown a profilometer for a running yarn strand 96 made up of a multiplicity of loosely twisted threads or yarns which constitutes a "slubby" product, i.e., one deliberately enlarged in diameter at random intervals. It is desirable to evaluate the quality of such a product in terms of the trends of both slub frequency and size and the general relationship of the slubs with respect to the main body of the running yarn, and this invention affords such a method.

FIG. 16A is a sectional view in plan of the apparatus through which yarn 96 passes longitudinally in non-contacting travel, and FIG. 16B is an end sectional view taken on line 16B—16B of FIG. 16A.

The apparatus comprises an elongated box-like structure the floor of which is made up of a multiplicity of independent radiation detectors 97, 97a (typically RCA SL2205) each insulated from its neighbors. The leads 97' from these detectors are led out to the right and all except those of the one detector denoted 97a are aggregated to give the large area signal supplied as input to amplifier 100, which again can be a Philbrick P65A provided with a variable feedback resistor 101 (typically 100K ohms) shunted by a capacitor 102 (tyically 100 $\mu\mu f$).

The small area raw signal is that generated by the single radiation detector 97a which constitutes the input to amplifier 104, which can be in all respects identical to amplifier 100, and provided with identical feedback facilities. The output of amplifier 104 is the small area signal. For best accuracy, the latter signal should be aggregated with the output of amplifier 100 to give the total area radiation detector response, and this can be conveniently accomplished by passing both amplifier outputs through summing resistors 105 (typically, 10K ohms) and thence to the negative side of the summing amplifier 103, typically a Philbrick model P65AU provided with identical feedback connections such as those previously described, the output of which is taken as the large area signal of the apparatus. In order to initially balance the 100% signal responses for the two areas examined to substantial equality prior to commencement of operation, the large area signal is taken off the tap of a variable resistor 112 (typically 10K ohms) connected to ground.

The radiation source 106 of FIG. 16B can be a tubular type supplying uniform radiation over its entire length via collimating lens 107, or the source can be a plurality of point sources, the radiation from which is then preferably passed through an intermediate translucent frosted glass 108 or the like to render the radiation intensity uniform prior to delivery into the strand-containing box. Side walls 110 are radiation-impervious, as is the top shield 111, which is preferably silvered on the interior to redirect radiation downwardly towards the strand in examination. The edges of detectors 97 external of side walls 110 are masked to avoid any unwanted radiation responses from the exterior of the examination chamber.

Variance computation for the embodiment of apparatus of FIGS. 16A and 16B can be by the approaches of either FIG. 6 or FIG. 8 as desired.

In operation, the running yarn is steadied in its course through the apparatus by passage under enough tension (provided by conventional pins or guide wheels) to avoid gross lateral flutter of the section of product under examination, and the characterization can be readily conducted at the usual yarn processing speeds of several thousand feet per minute.

In the preferred usual case, characterizations according to this invention will be by use of visible light as the examination radiation, since a rapid response system is thereby easily achieved at low cost. However, infrared, ultraviolet, gamma, alpha, beta or X-ray radiation, as well as other types, can all be used, depending upon the requirements of the particular situation.

The selection of examination area sizes in appropriate pairs depends heavily upon the requirements of the particular examination to be conducted; however, curves such as those of FIGS. 1 and 11A–11F enable a judicious choice to be made giving proper weight to the sensitivity as opposed to selectivity capabilities. A very wide range of area ratios extending from about 0.0001 to 0.70 is practicable, the particular ratio chosen taking into account the size of anomaly which it is desired to base examination upon and the degree of discrimination which it is necessary to preserve in order to obtain the particular characterization sought.

Figure 11A:
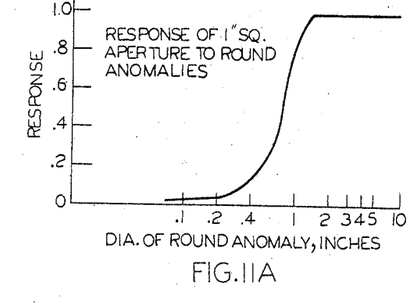
FIG. 11A—a single 1" square aperture viewing round anomalies.
Figure 11B:
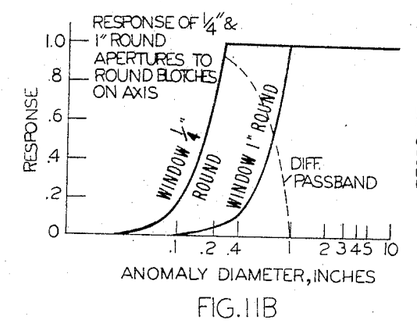
Figure 11C:
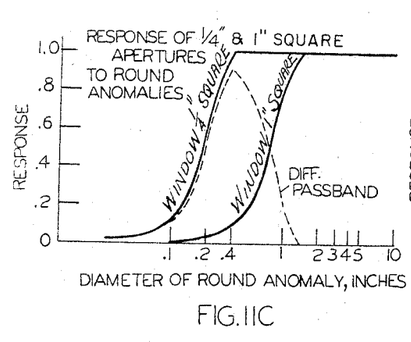
Figure 11D:
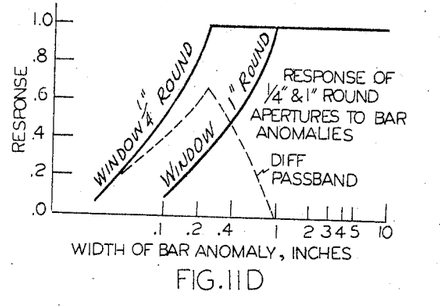
Figure 11E:
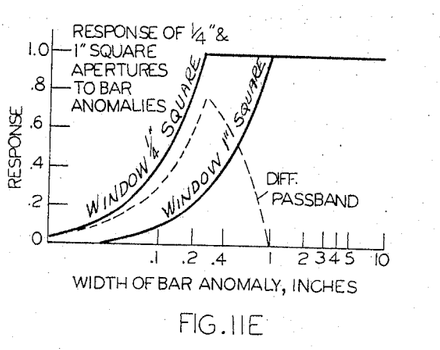
Figure 11F:
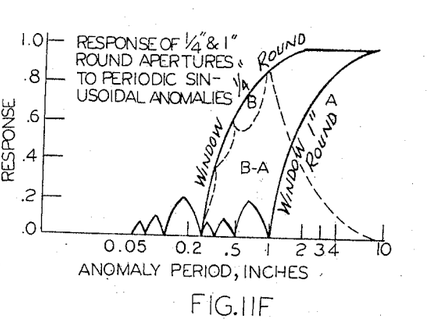

Anomaly periodicity is demonstrably overcome, even in the aggravated circumstances where the radiation excitation is varied in a sinusoidal spatial sense as shown in FIG. 11F, which still permits a choice of aperture pairs displaying a passband which is entirely usable, even though somewhat distorted by the ripple wavelength deliberately injected here by way of a test to determine the results. It should be mentioned that, while FIGS. 1 and 11A–11F treat of coincident apertures solely, the results are completely translatable to separated area viewing of the type described with reference to FIGS. 15A and 15B.

The term "function," as employed in the claims, is intended to comprehend not only special read-outs effected by computation solely but also modifications in the transducing of signals which are effected by the radiation detectors corresponding to photodetectors 8 and 12 of FIG. 5 and associated circuitry. Thus, in certain instances where optical density of a web in examination is an ideal parameter upon which to base comparisons, logarithmic detectors can be substituted for the photodetectors 8 and 12, employing the usual electronic circuits well known in the art in order to obtain raw signals from each channel in terms of log $I_0 I$, where $I_0$=intensity of the incident radiation and $I$=intensity of the transmitted radiation.

Also, it is sometimes desirable to effect linearization of raw, non-linear transduced signals, and the utilization of counter-matched non-linear electrical elements and the like as a part of the transducing circuit for final conversion of the read-out to linear form is entirely feasible.

As a practical matter characterizations are usually preferably performed on running webs or strands as an incident to high speed manufacturing processes. However, this invention is not limited to such practice and can operate on stationary laboratory samples over which the examining apparatus is itself traversed, as by mounting on rails or the like.

Moreover, it is possible to obtain characterizations according to this invention based upon isolated static viewings of a number of individual samples, accumulating the separate measurement results in a conventional memory device and ultimately using the data for computation of a quality index. In this case it will be understood that a different electronic circuit than FIG. 7 must be utilized, particularly one provided with D-C amplifiers instead of the A-C amplifiers 26″, all as will be understood by persons skilled in the art.

Inspection, of course, usually requires high speed scanning of representative expanses of webs or other objects in investigation; however, the apparatus of this invention is entirely suitable to flying scan operation, as to which a large number of mounts are well known in the art.

From the foregoing, it will be understood that this invention can be modified in numerous respects within the skill of the art without departure from its essential spirit, and it is intended to be limited only by the scope of the following claims.

What is claimed is:

1. A method of variability size discrimination by area sensing comprising directing a beam of radiation at an object to be examined, simultaneously viewing radiation emanating from a first area $x$ of said object and a second area of said object which is a fraction of $x$, said first area and said second area being proportioned so as to define between them a preselected range of object anomaly size, balancing the 100% signal responses of said first area and said second area to substantial equality prior to examination, and obtaining an index of the quality of said object as a function of the amounts of said radiation emanating from said first area of said object and from said second area of said object.

2. A method of variability size discrimination by area sensing according to claim 1 wherein said index of the quality of said object is a function of the difference between said amounts of radiation emanating from said first area of said object and from said second area of said object.

3. A method of variability size discrimination by area sensing according to claim 1 wherein said index of the quality of said object is computed in terms of the variance $\sigma^2$, where $\sigma^2$ is the standard deviation squared, defined as:

$$\sigma^2 = \frac{1}{\gamma} \int_0^\gamma (s-\bar{s})^2 dt$$

$s$=amplitude of instantaneous signal,
$\bar{s}$=mean amplitude of signal,
$\gamma$=memory time of the computer as set by the operator, and
$dt$=an increment in time.

4. A method of variability size discrimination by area sensing according to claim 3 wherein said index of the quality of said object is the variance computed from the difference between said amounts of radiation emanating from said first area of said object and from said second area of said object, taken as the quantity $s$.

5. A method of variability size discrimination by area sensing according to claim 3 wherein said index of the quality of said object is the difference between the pair of variances computed from said amounts of radiation emanating from said first area of said object and from said second area of said object individually.

6. An apparatus for variability size discrimination by area sensing comprising, in combination, a radiation source directing radiation at an object which it is desired to examine, means receiving radiation emanating from said object throughout a first area $x$ of said object and a second area of said object which is a fraction of $x$, said first area being proportioned with respect to said second area so as to define between them a preselected range of object anomaly size, means balancing the 100% signal responses of said first area and said second area to substantial equality prior to examination, and means indicating the quality of said object as a function of the amounts of said radiation emanating from said object.

7. An apparatus for variability size discrimination by area sensing according to claim 6 wherein said fraction of $x$ is in the range of approximately 0.0001 to 0.70.

8. An apparatus for variability size discrimination by area sensing according to claim 6 wherein said second area is coincident with said first area.

9. An apparatus for variability size discrimination by area sensing according to claim 6 incorporating means for concurrently examining said object throughout a multiplicity of different pairs of said first area $x$ of said object and said second area of said object which is a fraction of $x$.

10. An apparatus for variability size discrimination by area sensing comprising, in combination, a radiation source directing radiation at an object which it is desired to examine, a pair of apertures in optical line with said object receiving radiation emanating therefrom, a first aperture of said pair defining a first area $x$ of said object and a second aperture of said pair defining a second area of said object which is a fraction of $x$, said first area being proportioned with respect to said second area so as to define between them a preselected range of object anomaly size, radiation detectors in line on the rear sides with said first aperture and said second aperture, means balancing the 100% signal responses of said first area and said second area to substantial equality prior to examination, and means indicating the quality of said object as a function of the responses of said radiation detectors.

11. An apparatus for variability size discrimination by area sensing comprising, in combination, a radiation source directing radiation at an object which it is desired to examine, a first radiation detector in optical line with said object receiving radiation emanating from a first area $x$ of said object, a second radiation detector in optical line with said object receiving radiation emanating from a second area which is a fraction of $x$ of said object chosen with respect to said first area to define therewith a preselected range of object anomaly size, means balancing the 100% signal responses of said first area and said second area to substantial equality prior to examination, and means indicating the quality of said object as a function of the amounts of said radiation emanating from said object.

12. An apparatus for variability size discrimination by area sensing according to claim 11 wherein said first radiation detector is apertured to define the radiation passage for said second radiation detector, and said first area $x$ is taken to be the aggregate response of said first radiation detector and said second radiation detector.

13. An apparatus for variability size discrimination by area sensing according to claim 6 wherein said means indicating the quality of said object as a function of the amounts of said radiation emanating from said object include means computing an index of quality of said object in terms of the variance $\sigma^2$, wherein $\sigma^2$ is the standard deviation squared, defined as:

$$\sigma^2 = \frac{1}{\gamma} \int_0^\gamma (s-\bar{s})^2 dt$$

$s$=amplitude of instantaneous signal,
$\bar{s}$=mean amplitude of signal,
$\gamma$=memory time of the computer as set by the operator, and
$dt$=an increment in time.

14. An apparatus for variability size discrimination by area sensing according to claim 13 wherein said means computing an index of quality of said object in terms of said variance $\sigma^2$ determines said variance from the difference between said amounts of radiation emanating from said first area of said object and from said second area of said object, taken as the quantity $s$.

15. An apparatus for variability size discrimination by area sensing according to claim 13 wherein said means computing an index of quality of said object in terms of said variance $\sigma^2$ determines the difference between the pair of variances computed from said amounts of radiation emanating from said first area of said object and from said second area of said object individually.

References Cited

UNITED STATES PATENTS

| | | | |
|---|---|---|---|
| 3,114,791 | 12/1963 | Zabel et al. | 250—219 |
| 3,257,563 | 6/1966 | Laurent | 250—219 |

RALPH G. NILSON, *Primary Examiner.*

M. ABRAMSON, *Assistant Examiner.*

U.S. Cl. X.R.

88—14